United States Patent
Morikawa et al.

(10) Patent No.: US 7,896,410 B2
(45) Date of Patent: Mar. 1, 2011

(54) VEHICLE WITH ENERGY-ABSORBING MEMBER IN THE VEHICLE END PORTION STRUCTURE

(75) Inventors: Masaaki Morikawa, Toyota (JP);
Osamu Nagasaka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 151 days.

(21) Appl. No.: 11/921,739

(22) PCT Filed: Jun. 6, 2006

(86) PCT No.: PCT/JP2006/311691
§ 371 (c)(1),
(2), (4) Date: Dec. 18, 2008

(87) PCT Pub. No.: WO2006/132396
PCT Pub. Date: Dec. 14, 2006

(65) Prior Publication Data
US 2009/0267367 A1    Oct. 29, 2009

(30) Foreign Application Priority Data
Jun. 7, 2005    (JP) ............................. 2005-166798

(51) Int. Cl.
*B60R 19/18* (2006.01)
(52) U.S. Cl. ...................... 293/120; 293/132
(58) Field of Classification Search ............ 293/12, 293/133, 102, 121, 132, 155, 109, 110; 296/187.03, 296/187.04, 187.09; 188/371, 377
See application file for complete search history.

(56) References Cited

U.S. PATENT DOCUMENTS

| | | | |
|---|---|---|---|
| 4,154,469 A | | 5/1979 | Groupy et al. |
| 5,224,574 A | * | 7/1993 | Thum .......................... 188/371 |
| 6,817,638 B1 | * | 11/2004 | Choi et al. .................. 293/109 |
| 6,840,542 B2 | * | 1/2005 | Kim ........................... 280/784 |
| 2002/0033610 A1 | * | 3/2002 | Mori et al. .................. 293/102 |
| 2004/0056491 A1 | * | 3/2004 | Murata et al. ............... 293/120 |

FOREIGN PATENT DOCUMENTS

CN    1491837    4/2004

(Continued)

OTHER PUBLICATIONS

Chinese Office Action dated Mar. 27, 2009.

(Continued)

*Primary Examiner*—Patricia L Engle
*Assistant Examiner*—SunSurraye Westbrook
(74) *Attorney, Agent, or Firm*—Finnegan, Henderson, Farabow, Garrett & Dunner, LLP

(57) ABSTRACT

Thickness T in a vehicle longitudinal direction of a first energy-absorbing member 18, which is disposed at a front portion of a vehicle 10, tapers from a middle portion of a vehicle lateral direction (thickness Tc) toward an end portion (thickness Ts). For at least one (preferably both) of the first energy-absorbing member 18 and a second energy-absorbing member, rigidity in the vehicle longitudinal direction is made smaller from the vehicle lateral direction end portion toward the middle. Hence, loads acting on an impact body 102 when the vehicle 10 impacts with the impact body 102 are equalized in the vehicle lateral direction.

10 Claims, 6 Drawing Sheets

FOREIGN PATENT DOCUMENTS

| | | |
|---|---|---|
| DE | 31 21 628 A1 | 1/1983 |
| EP | 1 241 080 A2 | 9/2002 |
| EP | 1 291 247 A1 | 3/2003 |
| JP | 63-46947 | 2/1988 |
| JP | 2001-88634 | 4/2001 |
| JP | 2002-283937 | 10/2002 |
| JP | 2002-321576 | 11/2002 |
| JP | 2002-370674 | 12/2002 |
| JP | 2003-306047 | 10/2003 |
| JP | 2005138603 A * | 6/2005 |

OTHER PUBLICATIONS

Japanese Office Action dated Jun. 2, 2009.
International Search Report.
Written Opinion of the ISR.

* cited by examiner

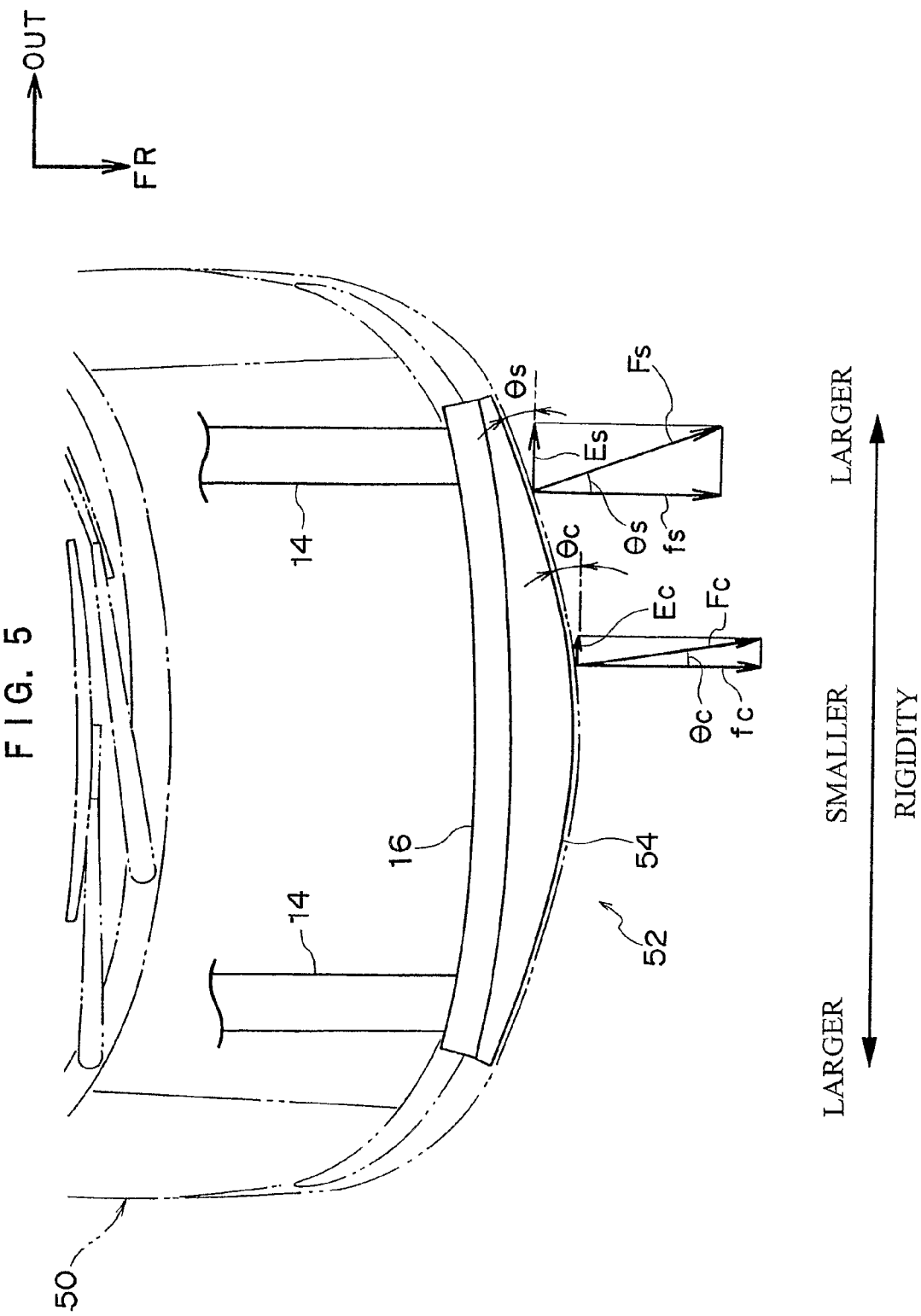

18 (MIDDLE VICINITY)

18 (END PORTION VICINITY)

VEHICLE WITH ENERGY-ABSORBING MEMBER IN THE VEHICLE END PORTION STRUCTURE

CROSS-REFERENCE TO RELATED APPLICATION

This application claims priority under 35 USC 119 from Japanese Patent Application No. 2005-166798, the disclosure of which is incorporated by reference herein.

TECHNICAL FIELD

The present invention relates to a vehicle end portion structure, and more particularly relates to a vehicle end portion structure provided with an energy-absorbing member which is provided at least one vehicle end portion in a vehicle longitudinal direction and absorbs energy of an external force by deformation.

BACKGROUND TECHNOLOGY

At a vehicle, for effectively absorbing energy when an impact body impacts, there is, for example, the provision of an energy-absorbing member at a front end portion, as described in the publication of Japanese Patent Application Laid-Open (JP-A) No. 2001-88634.

At a front portion vehicle body structure of a vehicle that is disclosed in this publication of JP-A No. 2001-88634, a protruding member, which is attached to a lower portion of a front portion of a front-side frame, is formed such that a longitudinal direction strength becomes greater from a vehicle lateral direction end portion toward a vehicle lateral direction middle.

Now, it is preferable if loads that an impact body receives from a vehicle at a time of impact with the impact body are equalized without regard to vehicle lateral direction positions.

However, with the structure disclosed in the publication of JP-A No. 2001-88634, because of shape and the like of the energy-absorbing member, loads that an impact body receives from the vehicle cannot be equalized without regard to vehicle lateral direction positions. For example, in a case in which thickness of the energy-absorbing member in the vehicle longitudinal direction is thicker at the middle than the vehicle lateral direction end portions, loads acting on an impact body will be larger at the vehicle lateral direction middle. Further, even if a front end portion of the energy-absorbing member is in a shape so as to be curved to rearward from the vehicle lateral direction middle toward the end portions, loads acting on an impact body will be larger at the vehicle lateral direction middle.

DISCLOSURE OF THE INVENTION

In consideration of the circumstances described above, an object of the present invention is to provide a vehicle end portion structure which is capable of equalizing, in a vehicle lateral direction, loads that act on an impact body.

In a first aspect of the present invention, there is a vehicle end portion structure provided with an energy-absorbing member, which is provided at least one vehicle end portion of a vehicle longitudinal direction and absorbs energy of an external force by deformation, wherein a vehicle longitudinal direction thickness of the energy-absorbing member is formed so as to partially differ in a vehicle lateral direction, and a part at which this thickness is thicker has a relatively lower vehicle longitudinal direction rigidity than a thinner part.

At the energy-absorbing member of this vehicle end portion structure, the vehicle longitudinal direction thickness partially differs in the vehicle lateral direction, and the vehicle longitudinal direction rigidity is relatively lowered at parts at which this thickness is thicker than at thinner parts. That is, parts at which the thickness is relatively thick are formed with low rigidity in comparison with thinner parts, and thus loads that act on an impact body will be equalized in the vehicle lateral direction.

Herein, the vehicle longitudinal direction rigidity of the energy-absorbing member may be such that, at least when parts with differing vehicle longitudinal direction thicknesses are compared with one another, the rigidities at those parts vary. For example, in a case in which the vehicle longitudinal direction thickness of the energy-absorbing body varies continuously in the vehicle lateral direction, it is preferable if the vehicle longitudinal direction rigidity also varies continuously, but it may also vary stepwise. Further, in a case in which the vehicle longitudinal direction thickness of the energy-absorbing member varies discontinuously in the vehicle lateral direction, it is preferable if the vehicle longitudinal direction rigidity correspondingly varies discontinuously, but it may also vary continuously. Further, in a case in which, for example, a local protrusion portion, recess portion or the like is provided at the energy-absorbing member and the vehicle longitudinal direction thickness partially varies at that part, it is preferable if the rigidity accordingly varies locally. However, in a case in which effects of such protrusion portions/recess portions are small, local variations of rigidity may be dispensed with and it may be varied continuously.

The vehicle end portion structure of the above-described first aspect may be structured such that the vehicle longitudinal direction thickness of the energy-absorbing member becomes thinner from a vehicle lateral direction middle toward an end portion and the vehicle longitudinal direction rigidity of this energy-absorbing member becomes smaller from the vehicle lateral direction end portion toward the middle.

That is, the overall shape of the energy-absorbing member relating to the first aspect of the present invention is not particularly limited, but if formed as a shape in which the vehicle longitudinal direction thickness thereof becomes thinner from the vehicle lateral direction middle toward the end portion, will be excellent as a design (appearance). With an energy-absorbing member of such a shape, if the vehicle longitudinal direction rigidity is made smaller from the vehicle lateral direction end portion toward the middle, loads that act on an impact body can be equalized in the vehicle lateral direction.

A second aspect of the present invention is a vehicle end portion structure provided with an energy-absorbing member, which is provided at least one vehicle end portion of a vehicle longitudinal direction and absorbs energy of an external force by deformation, wherein an outer side end portion in the vehicle longitudinal direction of the energy-absorbing member is curved so as to go toward a middle of the vehicle longitudinal direction, from a middle toward an end portion of a vehicle lateral direction, and a vehicle longitudinal direction rigidity of this energy-absorbing member is made smaller from the vehicle lateral direction end portion toward the middle.

At the energy-absorbing member of this vehicle end portion structure, the outer side end portion in the vehicle longitudinal direction is curved so as to go toward the vehicle longitudinal direction middle, from the vehicle lateral direction middle toward the end portion. With the energy-absorbing member of such a shape, a component force toward a vehicle lateral direction outer side of a reaction force that an impact body receives from the energy-absorbing body becomes greater the further an impact position is toward the vehicle lateral direction outer side (a force removing the impact body toward the vehicle lateral direction outer side acts). Conversely, with regard to the energy-absorbing member, the vehicle longitudinal direction rigidity is made smaller from the vehicle lateral direction end portion toward the middle. That is, a location at which a force removing the impact body toward the vehicle lateral direction outer side is larger has lower rigidity in comparison with a location at which this force is smaller. Thus, loads acting on the impact body can be equalized in the vehicle lateral direction.

Further, a third aspect of the present invention is provided by a vehicle end portion structure: which is provided with an energy-absorbing structure, which is provided at a vehicle end portion of at least one of a vehicle front side and rear side, deforms when an external force acts, and absorbs energy of the external force; and which has a plurality of parts in a vehicle lateral direction at which thicknesses in a vehicle longitudinal direction of the energy-absorbing member differ, rigidities with respect to the vehicle longitudinal direction of the energy-absorbing member at the plurality of differing parts having complementary magnitudes with respect to the respective thicknesses of the plurality of differing parts, such that loads due to an external force which acts on the energy-absorbing member at a time of energy absorption are equalized.

Herein, the above-mentioned 'rigidity' may be any physical quantity which can be specified such that loads acting on an impact body can be equalized in a vehicle lateral direction; specifically, a deflection load inclination (spring constant) can be mentioned.

Because the present invention is structured as described above, it is possible to equalize loads acting on an impact body in a vehicle lateral direction.

BRIEF DESCRIPTION OF THE DRAWINGS

FIG. 5 is a schematic plan view showing a vicinity of a first energy-absorbing member of a vehicle at which a vehicle end portion structure of a second embodiment of the present invention is employed.

BEST MODE FOR CARRYING OUT THE INVENTION

Figure 1:
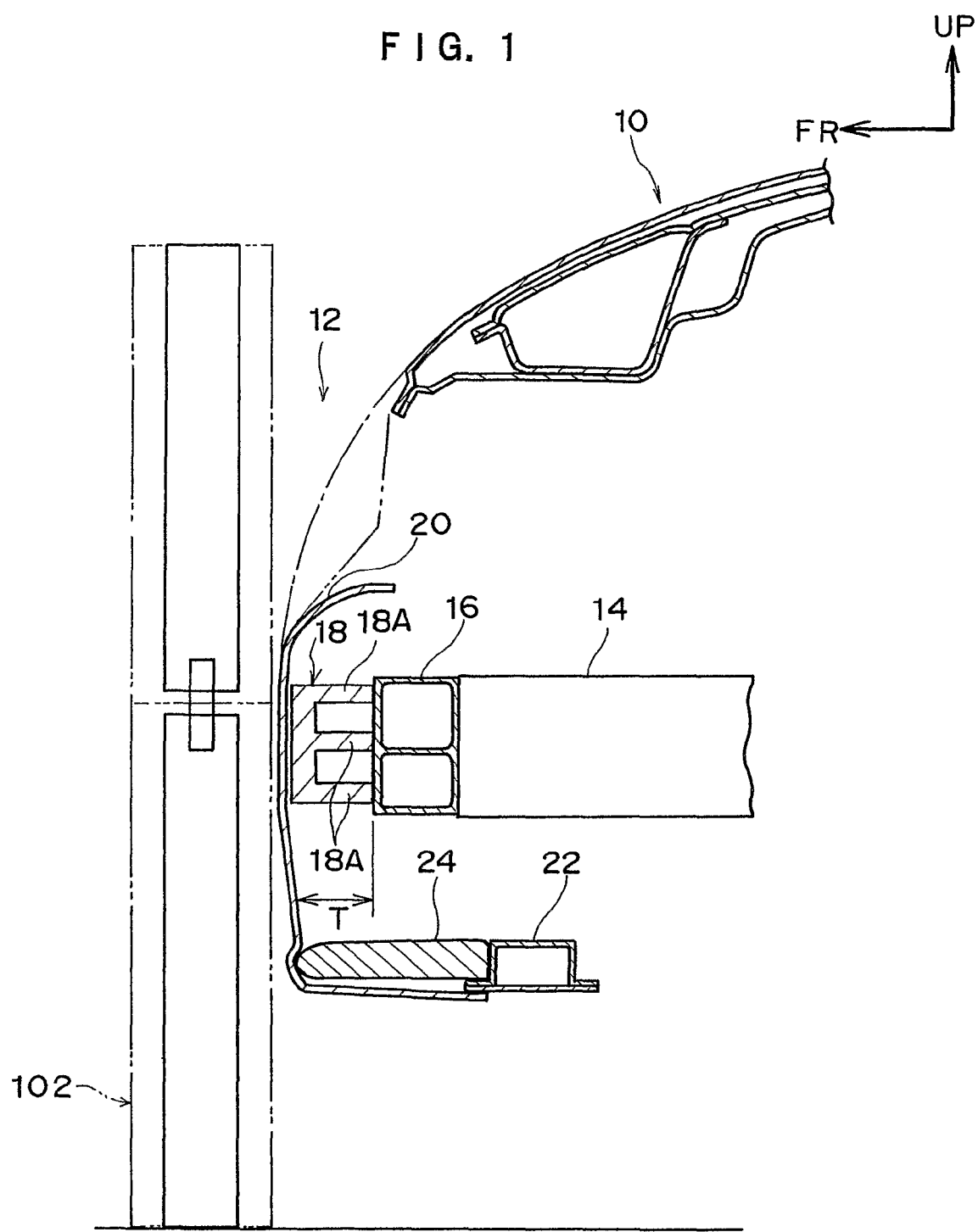
FIG. 1 is a schematic sectional view showing a front portion of a vehicle at which a vehicle end portion structure of a first embodiment of the present invention is employed.
Figure 2:
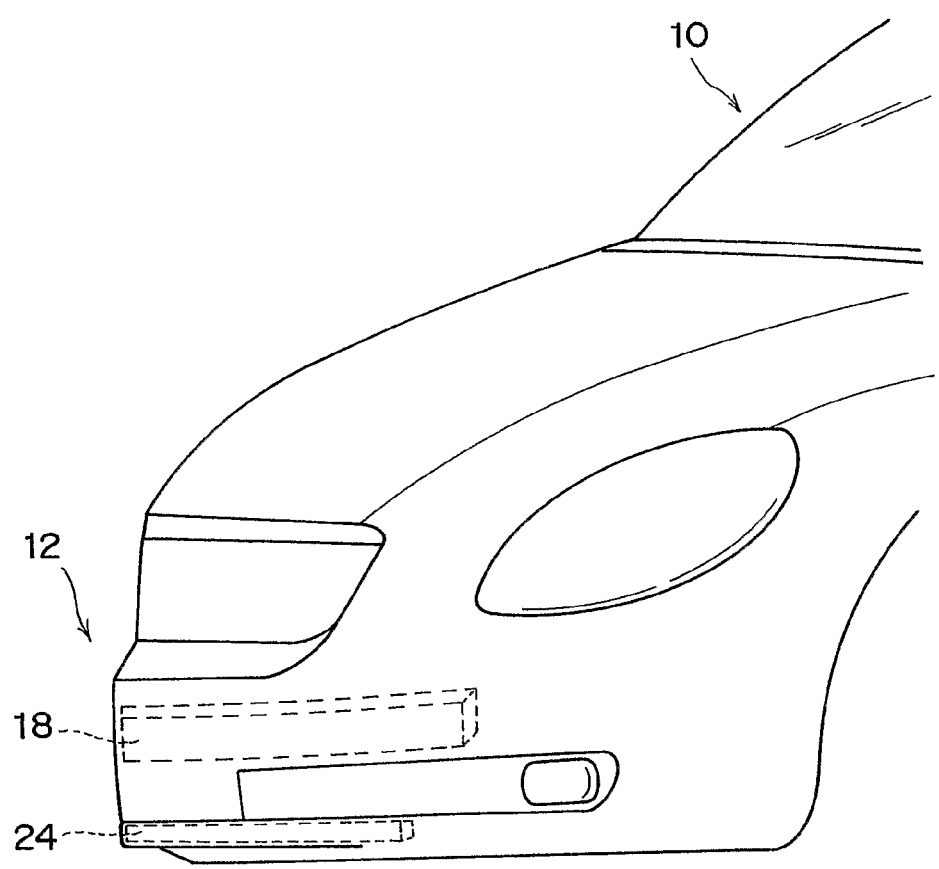
FIG. 2 is a schematic side view showing the front portion of the vehicle at which the vehicle end portion structure of the first embodiment of the present invention is employed.

In FIGS. 1 to 4, a longitudinal direction end portion vicinity (here, as an example, a front portion) of a vehicle 10 at which a vehicle end portion structure 12 of a first embodiment of the present invention is employed is shown. Herein, in each image, a vehicle forward direction is represented by an arrow FR, a vehicle upward direction by an arrow UP, and a vehicle lateral direction outer side by an arrow OUT, respectively.

At this vehicle 10, two side members 14, which extend in the vehicle longitudinal direction, are dually disposed to be spaced by a predetermined separation, so as to be symmetrical about a vehicle centre line CL. At front ends thereof a bumper reinforcement 16, which extends in the vehicle lateral direction, is supported. Further, at a front end of the bumper reinforcement 16, a first energy-absorbing member 18, which similarly extends in the vehicle longitudinal direction, is mounted, and is covered by a bumper cover 20. This first energy-absorbing member 18 absorbs energy by deformation in a case in which the vehicle impacts with an impact body 102 (refer to FIG. 1), and has an action of moderating an impact applied to the impact body 102 from the vehicle 10.

A support member 22 is disposed downward of the side members 14. A second energy-absorbing member 24, which extends in the vehicle lateral direction, is mounted at a front end of this support member 22. The second energy-absorbing member 24, similarly to the first energy-absorbing member 18, absorbs energy by deformation in a case in which the impact body 102 impacts with the vehicle, and has an action of moderating an impact applied to the impact body 102 from the vehicle 10. In particular, at the second energy-absorbing member 24, the above mentioned impact-moderation action is exhibited at downward positions relative to the first energy-absorbing member 18. For example, if it is assumed that the impact body 102 is a body that is provided with a flexion portion 104 at approximately the same height as the first energy-absorbing member 18, as shown in FIG. 1, then, because the second energy-absorbing member 24 moderates the impact lower than the flexion portion 104, excessive flexion of the flexion portion 104 can be prevented.

Here, ordinarily, a required stroke length of deformation of the first energy-absorbing member 18 is determined with a view to more effectively moderating the impact that acts on the impact body 102. As can be understood from FIG. 3, a shape (in particular, a vehicle longitudinal direction thickness T) of the first energy-absorbing member 18 is governed by the bumper cover 20 and the bumper reinforcement 16, and a front end portion will often have a shape, when the vehicle 10 is viewed in plan view, with protrusions toward the forward side. Further, with a view to protecting an occupant and the vehicle body at a time of impact with the impact body 102 or the like, it is preferable for the side members 14 to be longer. Because of the above reasons, the thickness T in the vehicle longitudinal direction of the first energy-absorbing member 18 is tapered from a vehicle lateral direction middle portion (thickness Tc) toward end portions (thickness-Ts), and the relationship $Tc > Ts$ is established.

Then, in the present embodiment, for at least one (preferably both) of the first energy-absorbing member 18 and the second energy-absorbing member 24, rigidity in the vehicle longitudinal direction is made smaller from the vehicle lateral direction end portions toward the middle.

With the present embodiment which is structured thus, when the vehicle 10 impacts against the impact body 102, the first energy-absorbing member 18 and the second energy-absorbing member 24 deform and absorb energy, and an impact acting on the impact body 102 is moderated.

At this time, with the present embodiment, because rigidity in the vehicle longitudinal direction of at least one of the first energy-absorbing member 18 and the second energy-absorbing member 24 is made smaller from the vehicle lateral direction end portions toward the middle, loads acting on the impact body 102 are equalized at every position in the vehicle lateral direction. That is, with a structure in which rigidity of the first energy-absorbing member 18 or the second energy-absorbing member 24 is substantially uniform in the vehicle lateral direction or a structure in which the vehicle lateral direction middle portion rigidity is larger than that of the end portions, which differs from the present embodiment, loads acting on the impact body 102 from the vehicle 10 would be larger at the vehicle lateral direction middle portion than the lateral direction end portion. However, with the present embodiment, such a situation will not occur.

Herein, in the above description, as the shape of the first energy-absorbing member 18 at which the vehicle end portion structure of the first embodiment is employed, a shape in which the thickness T in the vehicle longitudinal direction tapers from the vehicle lateral direction middle portion toward the end portions has been mentioned. However, other than this, it is possible to employ a shape at the first energy-absorbing member in which the vehicle longitudinal direction thickness T differs at least one portion in the vehicle lateral direction in comparison with other parts. That is, if the vehicle longitudinal direction rigidity at a part at which this thickness T is relatively thick is made lower than the vehicle longitudinal direction rigidity at a relatively thin part, it is possible to equalize loads acting on the impact body 102 in the vehicle lateral direction.

In FIG. 5, a longitudinal direction end portion vicinity (here, similarly to the first embodiment, a front portion) of a vehicle at which a vehicle end portion structure 52 of a second embodiment of the present invention is employed is shown. Herein, in the second embodiment, structural elements, members and the like that are the same as the first embodiment are assigned the same reference numerals, and detailed descriptions thereof are omitted.

In this second embodiment, a vehicle 50 serves as an object of application, at which, with a view to improving design (appearance) of the front portion, a shape (a round shape) is employed in which, when viewed in plan view, the vehicle lateral direction middle bulges forward, and gradually curves to rearward toward the lateral direction end portions.

Then, similarly to the first embodiment, rigidity in the vehicle longitudinal direction of at least one (preferably both) of a first energy-absorbing member 54 and a second energy-absorbing member 56 (not shown in FIG. 5; refer to FIG. 1, etc. of the first embodiment), is made smaller from the vehicle lateral direction end portions toward the middle.

Here, loads that act on the impact body 102 from the vehicle with the shape (round shape) in which the front portion, as described above, curves to rearward from the vehicle lateral direction middle toward the end portions, will be considered. A case is assumed in which loads $f_c$ and $f_s$ act on the impact body 102 at a vehicle lateral direction middle vicinity and a vehicle lateral direction end portion vicinity. Herein, these loads are made equal.

$$f_c = f_s$$

For angles $\theta_c$ and $\theta_s$ formed between a normal direction and an impact action direction at positions that impact with the impact body 102, there is the relationship $$\theta_c < \theta_s$$

Accordingly, in regard to loads $F_c$ and $F_s$ in diagonal directions which the impact body 102 actually receives from the vehicle, $F_s$ also has a greater component force toward the vehicle lateral direction outer side than $F_c$. In other words, when forces on the impact body 102 that cause movement toward the vehicle lateral direction outer side are considered, a force $E_s$ at the vehicle lateral direction end portion vicinity is greater than such a force $E_c$ at the vehicle lateral direction middle vicinity.

$$E_c < E_s$$

Thus, with progress toward the vehicle lateral direction end portion, the impact body 102 acts to disengage to the lateral direction outer side. Therefore, a load that the impact body 102 receives in practice will become smaller.

In the present embodiment, rigidity in the vehicle longitudinal direction of at least one of the first energy-absorbing member 54 and a second energy-absorbing member 56 is made smaller from the vehicle lateral direction end portions toward the middle. Thus, in the vehicle lateral direction, loads that act on the impact body 102 are equalized.

As has been described above, with either of the embodiments of the present invention, equalizing loads acting the impact body 102 without regard to positions in the vehicle lateral direction is possible.

Figure 3:
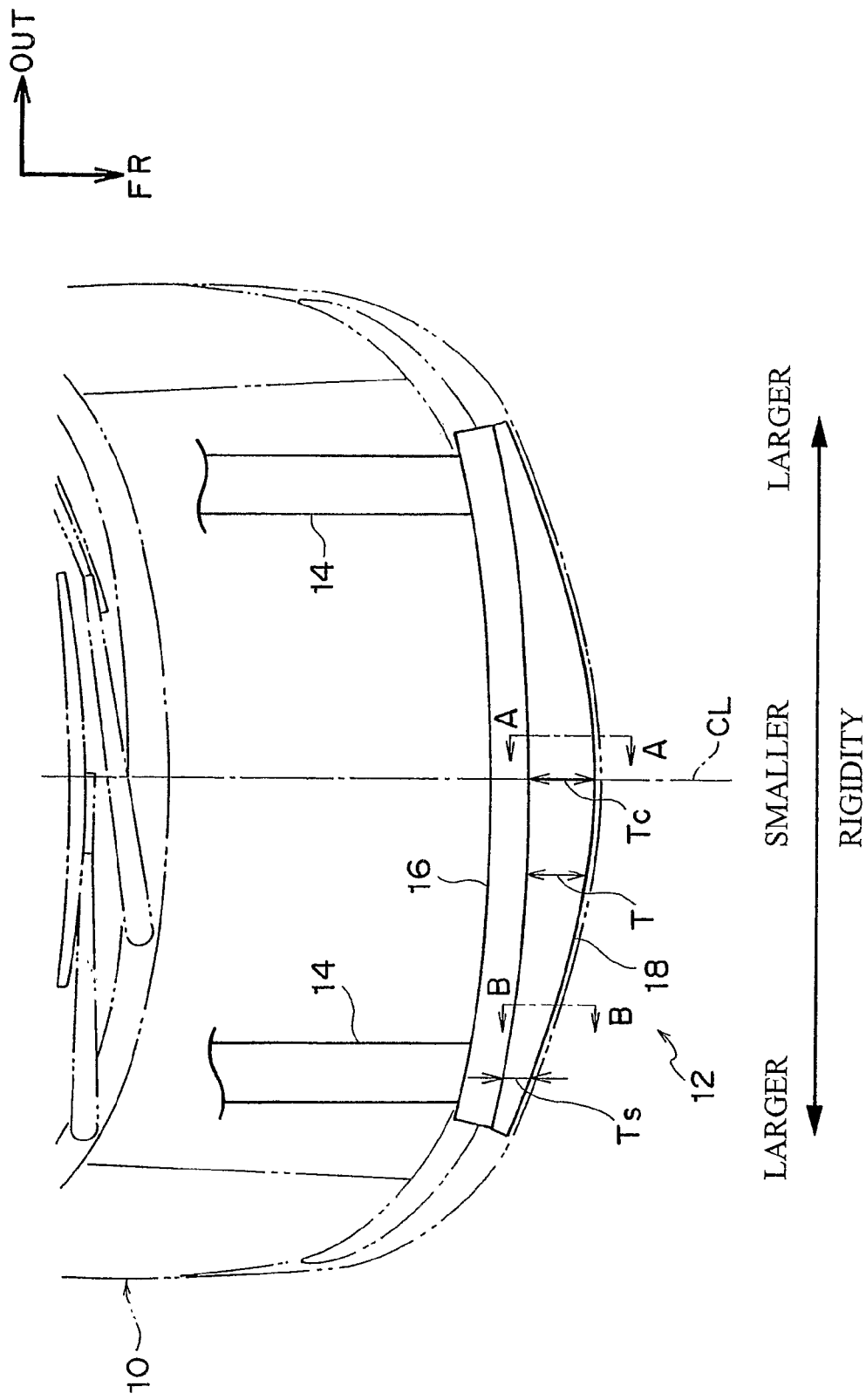
FIG. 3 is a schematic plan view showing a vicinity of a first energy-absorbing member of the vehicle at which the vehicle end portion structure of the first embodiment of the present invention is employed.
Figure 4:
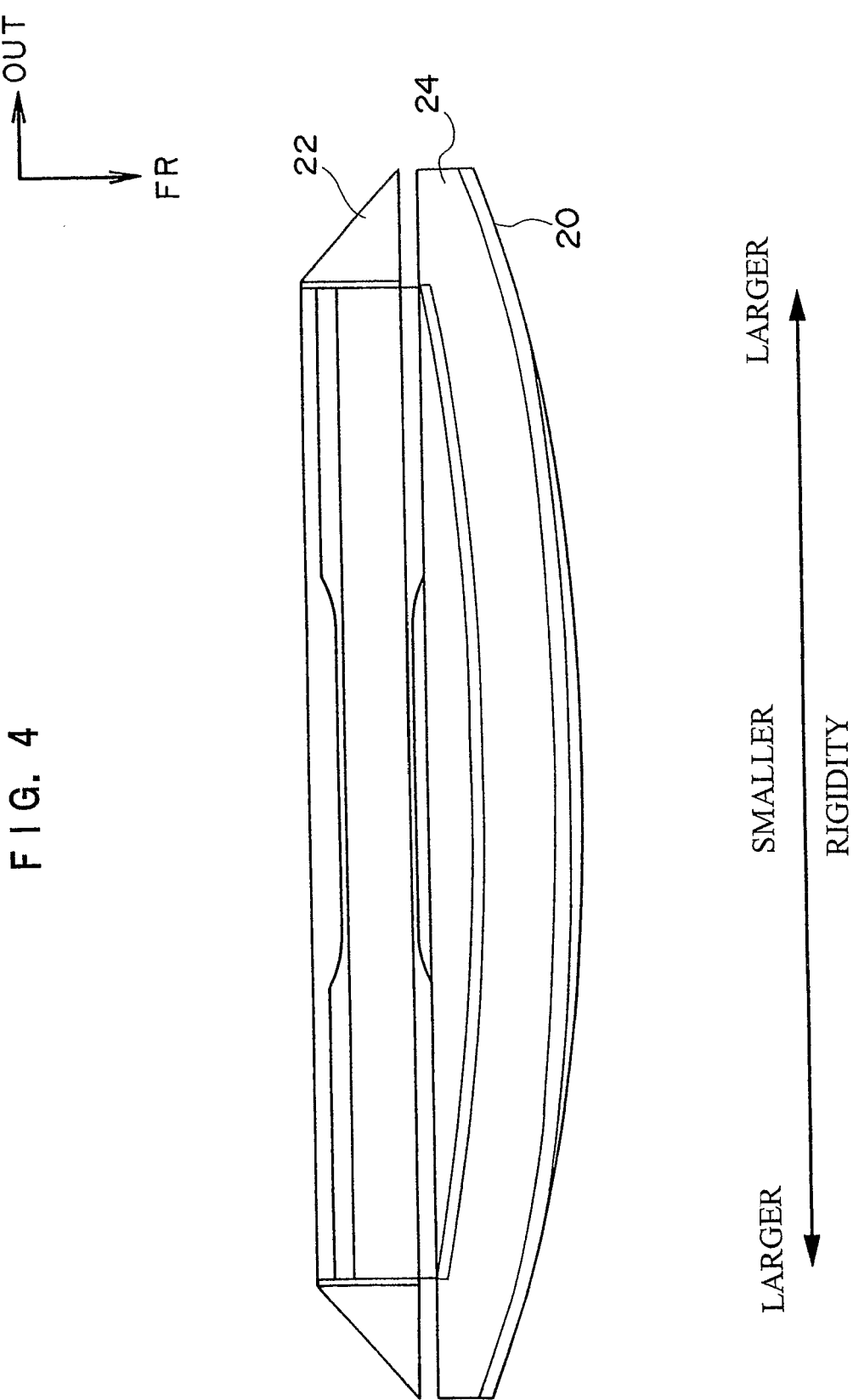
FIG. 4 is a schematic plan view showing a vicinity of a second energy-absorbing member of the vehicle at which the vehicle end portion structure of the first embodiment of the present invention is employed.

Herein, as can be understood from the above descriptions, a shape of the first energy-absorbing member 18 which is an object of application in the first embodiment (the vehicle longitudinal direction thickness becoming thinner from the vehicle lateral direction middle toward the end portions) and a shape of the first energy-absorbing member which is an object of application in the second embodiment (an outer side end portion in the vehicle longitudinal direction being curved so as to go toward a vehicle longitudinal direction middle from the vehicle lateral direction middle toward the end portions; that is, for example, if this is a vehicle front portion, the outer side end portion of the first energy-absorbing member curving so as to go toward the vehicle rearward from the vehicle lateral direction middle along the end portions) are compatible, as can be understood if FIG. 3 and FIG. 5 are compared (there is a common shape). However, it is not necessary to combine these, which is to say, if a vehicle is provided with a first energy-absorbing member whose thickness in the vehicle longitudinal direction partially differs, the first embodiment is applicable. Similarly, if a vehicle is provided with a first energy-absorbing member whose outer side end portion in the vehicle longitudinal direction is curved so as to go toward the vehicle longitudinal direction middle, from the vehicle lateral direction middle toward the end portions, the second embodiment is applicable.

In the present invention, material(s) of the first energy-absorbing member 18 and the second energy-absorbing member 24 is/are not particularly limited as long as it is/they are capable of absorbing energy by deformation, and can be structured by, for example, a resin material formed by foam molding, injection molding, stamp molding, extrusion molding, blow molding or the like, or a metal material such as aluminium, steel or the like.

Figure 6A:
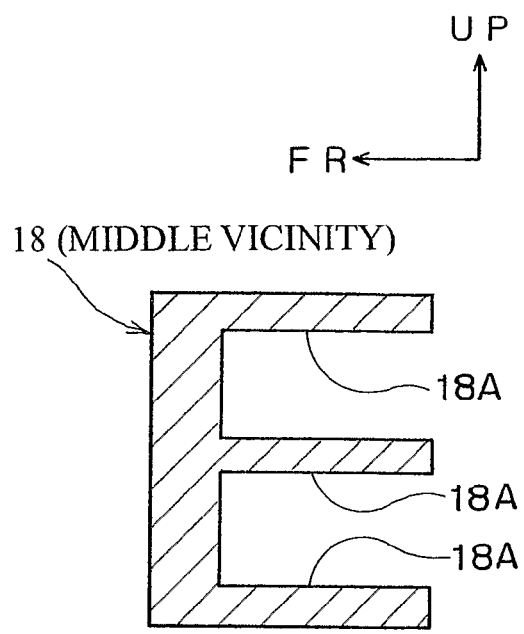
FIGS. 6A and 6B show a first energy-absorbing member relating to the present invention, FIG. 6A being a sectional view along line A-A of FIG. 3, and FIG. 6B being a sectional view along line B-B of FIG. 3.
Figure 6B:
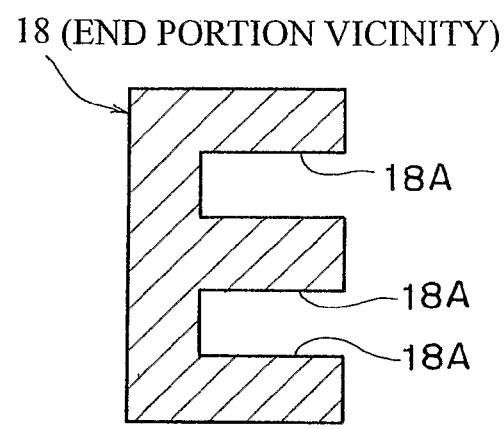

Further, a structure causing rigidity of these energy-absorbing members to partially vary is also not particularly limited. For example, as shown in FIG. 6, in a case of a structure in which the first energy-absorbing member 18 is provided with a plurality of ribs 18A, rigidity can be partially varied by varying thicknesses (here, vertical direction heights) of these ribs 18A. Further, a middle vicinity of the first energy-absorbing member 18 may have a relatively low density such that a spring constant is low and an end portion vicinity may have a relatively high density such that a spring constant is high. Herein, in relation to the second energy-absorbing member 24 too, rigidity can be partially varied by similar structures.

Structures which mount the first energy-absorbing member and the second energy-absorbing member to the vehicle are also not particularly limited. For example, if it is the front portion of the vehicle, an engine under-cover may be extended or the like in accordance with requirements, and these energy-absorbing members mounted thereto.

Further, examples of the present invention being applied to a front portion of a vehicle have been illustrated in the above descriptions, but it may also be applied to a rear portion of a vehicle.

INDUSTRIAL APPLICABILITY

The present invention is applied to an end portion of a longitudinal direction of a vehicle, and is effective for equalizing loads that an impact body experiences at a time of impact with the vehicle to which a vehicle structure of the present invention has been applied.

The invention claimed is:

1. A vehicle end portion structure, comprising:
an energy-absorbing member, which is provided at at least one vehicle end portion of a vehicle longitudinal direction and absorbs energy of an external force by deformation, wherein
a vehicle longitudinal direction thickness of the energy-absorbing member becomes thinner from a vehicle lateral direction middle portion toward an end portion, the vehicle lateral direction middle portion being positioned at a center of a vehicle in a vehicle lateral direction,
a vehicle longitudinal direction rigidity of a part at which the vehicle longitudinal direction thickness of the energy-absorbing member is thicker is lower than the vehicle longitudinal direction rigidity of a part at which the vehicle longitudinal direction thickness of the energy-absorbing member is thinner,
the energy-absorbing member has a plurality of ribs each of which extends in the vehicle longitudinal direction, characterized in that the energy-absorbing member has an E-shaped vehicle lateral direction cross-section, and
a vehicle height direction thickness of the ribs varies in the vehicle lateral direction so as to increase from the part of the energy-absorbing member at which the vehicle longitudinal thickness is thicker towards the part of the energy-absorbing member at which the vehicle longitudinal thickness is thinner.

2. The vehicle end portion structure of claim 1, wherein the vehicle longitudinal direction rigidity of the energy-absorbing member becomes smaller from the vehicle lateral direction end portion toward the middle portion.

3. The vehicle end portion structure of claim 1, wherein an outer side end portion in the vehicle longitudinal direction of the energy-absorbing member is curved from a middle portion toward an end portion thereof in the vehicle lateral direction so as to go toward a middle of the vehicle longitudinal direction, and the vehicle longitudinal direction rigidity of the energy-absorbing member becomes smaller from the vehicle lateral direction end portion toward the middle portion.

4. The vehicle end portion structure of claim 1, wherein the vehicle longitudinal direction thickness of the energy-absorbing member varies continuously along the vehicle lateral direction, and the rigidity varies continuously along the vehicle lateral direction.

5. The vehicle end portion structure of claim 1, wherein the vehicle longitudinal direction thickness of the energy-absorbing member varies discontinuously in the vehicle lateral direction, and the rigidity varies discontinuously along the vehicle lateral direction.

6. The vehicle end portion structure of claim 1, wherein the at least one vehicle end portion of the vehicle longitudinal direction is a vehicle front end portion, and an outer side end portion in the vehicle longitudinal direction of the energy-absorbing member is curved from a middle toward an end portion thereof in the vehicle lateral direction so as to go toward the vehicle rearward direction.

7. A vehicle end portion structure, comprising:
an energy-absorbing member, which is provided at at least one vehicle end portion of a vehicle longitudinal direction and absorbs energy of an external force by deformation, wherein
an outer side end portion in the vehicle longitudinal direction of the energy-absorbing member is curved from a middle portion toward an end portion thereof in a vehicle lateral direction so as to go toward a middle of the vehicle longitudinal direction, the middle portion being positioned at a center of a vehicle in the vehicle lateral direction,
a vehicle longitudinal direction rigidity of the energy-absorbing member becomes smaller from the vehicle lateral direction end portion toward the middle portion of the energy-absorbing member,
the energy-absorbing member has a plurality of ribs each of which extends in the vehicle longitudinal direction, characterized in that the energy-absorbing member has an E-shaped vehicle lateral direction cross-section, and
a vehicle height direction thickness of the ribs varies in the vehicle lateral direction so as to increase from the middle portion of the energy-absorbing member towards the end portion of the energy-absorbing member,
wherein a vehicle longitudinal direction thickness of the energy-absorbing member becomes thinner from the middle portion toward the end portion.

8. The vehicle end portion structure of claim 7, wherein a vehicle longitudinal direction thickness of the energy-absorbing member varies continuously along the vehicle lateral direction, and the rigidity varies continuously along the vehicle lateral direction.

9. The vehicle end portion structure of claim 7, wherein a vehicle longitudinal direction thickness of the energy-absorbing member varies discontinuously in the vehicle lateral direction, and the rigidity varies discontinuously along the vehicle lateral direction.

10. The vehicle end portion structure of claim 7, wherein the at least one vehicle end portion of the vehicle longitudinal direction is a vehicle front end portion, and the outer side end portion in the vehicle longitudinal direction of the energy-absorbing member is curved from the middle portion toward the end portion thereof in the vehicle lateral direction so as to go toward the vehicle rearward direction.

* * * * *